United States Patent
Graf et al.

(10) Patent No.: US 7,099,762 B2
(45) Date of Patent: Aug. 29, 2006

(54) POWERTRAIN OF A MOTOR VEHICLE AND METHOD FOR CONTROLLING SAID POWERTRAIN

(75) Inventors: Friedrich Graf, Sinzing (DE); Florian Gutknecht-Stöhr, Regensburg (DE); Gregor Probst, Landshut (DE); Martin Rampeltshammer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/840,499

(22) Filed: May 6, 2004

(65) Prior Publication Data

US 2004/0210373 A1    Oct. 21, 2004

Related U.S. Application Data

(63) Continuation of application No. PCT/DE02/04093, filed on Nov. 4, 2002.

(30) Foreign Application Priority Data

Nov. 12, 2001  (DE) ............................... 101 55 433

(51) Int. Cl.
*G06F 17/00* (2006.01)
*G06F 19/00* (2006.01)
*G06F 7/00* (2006.01)

(52) U.S. Cl. ...................... 701/54; 701/51; 701/53; 701/57; 477/62; 477/78; 477/97

(58) Field of Classification Search ................. 701/51, 701/53–54, 57, 66–67, 60; 477/62, 78, 97, 477/109–110, 118, 121, 154–155, 166, 169, 477/181; 180/6.44, 65.2, 337; 475/23, 32, 475/72; 73/118.1; 74/732.1
See application file for complete search history.

(56) References Cited

U.S. PATENT DOCUMENTS 4,487,303 A    12/1984  Boueri et al. ............. 192/0.052

(Continued)

FOREIGN PATENT DOCUMENTS

DE    100 36 966 A1    4/2001

(Continued)

OTHER PUBLICATIONS

Liao et al., The research of improving shift quality through the intergrated powertrain control, 1999, Internet, p. 395-397.*

(Continued)

*Primary Examiner*—Thomas G. Black
*Assistant Examiner*—McDieunel Marc
(74) *Attorney, Agent, or Firm*—Baker Botts L.L.P.

(57) ABSTRACT

The power train (1) includes a controlled drive source (3), a clutch (6), an automatically shifting transmission (7) and a data transmission device (2). The power train contains an additional drive source (12) and is fitted with a control system by means of which a correction value (K pid) for the drive source torque is generated on the basis of the comparison of the actual behavior of the drive train with a modeled behavior of a drive train fitted with a hydrodynamic torque converter. The behavior of a torque converter is simulated by a regulating circuit (21–27).

14 Claims, 5 Drawing Sheets

U.S. PATENT DOCUMENTS

| | | | |
|---|---|---|---|
| 4,680,959 A | | 7/1987 | Henry et al. .................. 73/117 |
| 4,930,374 A | * | 6/1990 | Simonyi et al. .............. 477/62 |
| 4,953,091 A | * | 8/1990 | Baltusis et al. ............... 701/67 |
| 5,123,302 A | * | 6/1992 | Brown et al. ............... 477/154 |
| 5,822,708 A | * | 10/1998 | Wagner et al. ................ 701/54 |
| 5,887,670 A | | 3/1999 | Tabata et al. ............. 180/65.2 |
| 6,095,945 A | * | 8/2000 | Graf ............................ 477/97 |
| 6,098,007 A | | 8/2000 | Fritz ........................... 701/93 |
| 6,101,440 A | * | 8/2000 | Wagner et al. ................ 701/67 |
| 6,125,314 A | * | 9/2000 | Graf et al. .................... 701/53 |
| 6,684,143 B1 | * | 1/2004 | Graf et al. .................... 701/51 |

FOREIGN PATENT DOCUMENTS

EP        1 068 977 A2     7/2000

OTHER PUBLICATIONS

Deacom et al., A modular approach to the computer simulation of a passenger car powertrain incorporating a diesel engine and continuously variable transmission, 1994, Internet, p. 320-325.*

Liao et al., The research of improving shift quality through the integrated powertrain control, 1999, IEEE, pp. 395-397.*

Deacom et al., A modular approach to the computer simulation of a passenger car powertrain incorporating a diesel engine and continuously variable transmission, 1994, IEEE, p. 320-325.*

* cited by examiner

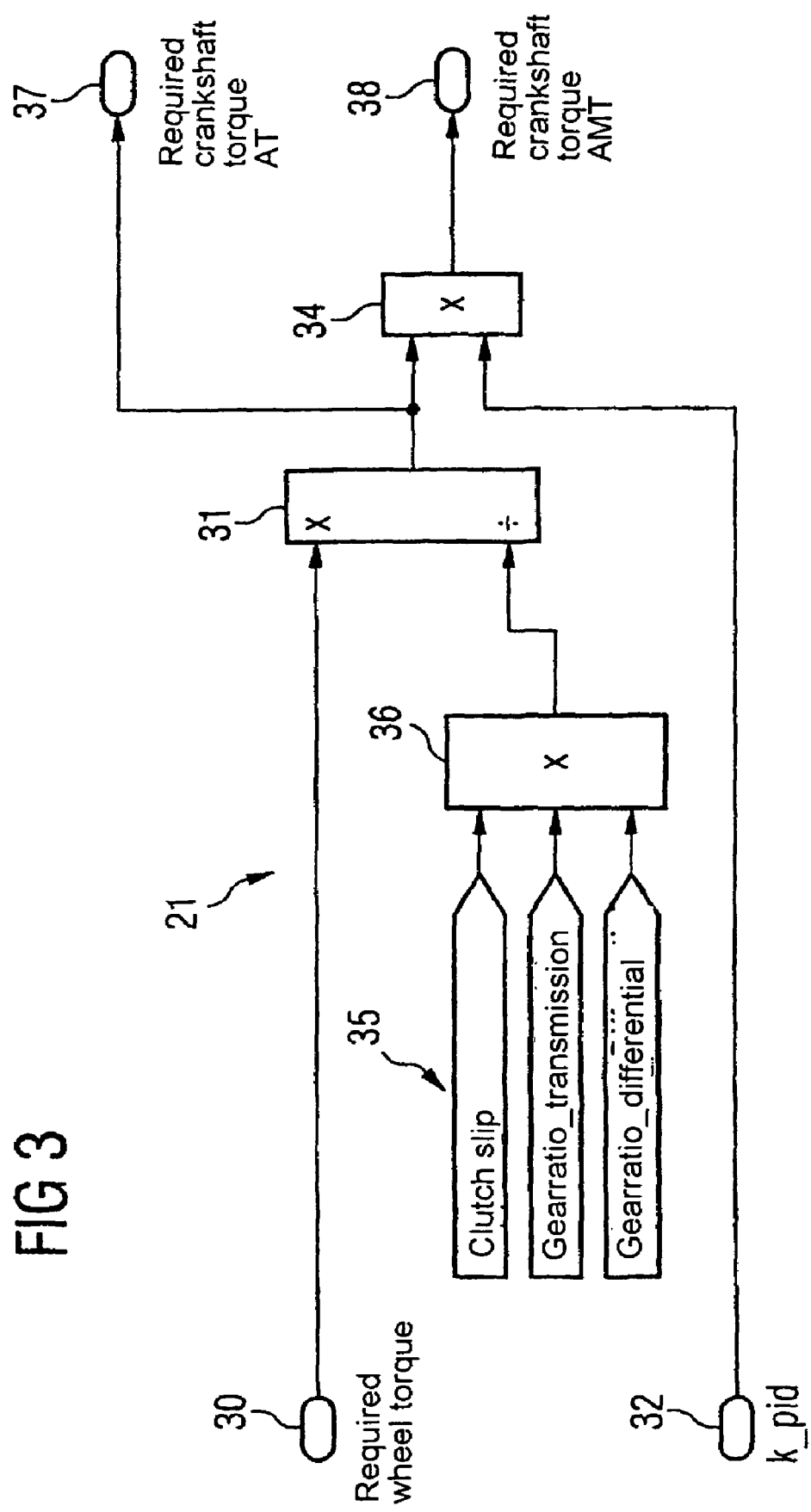

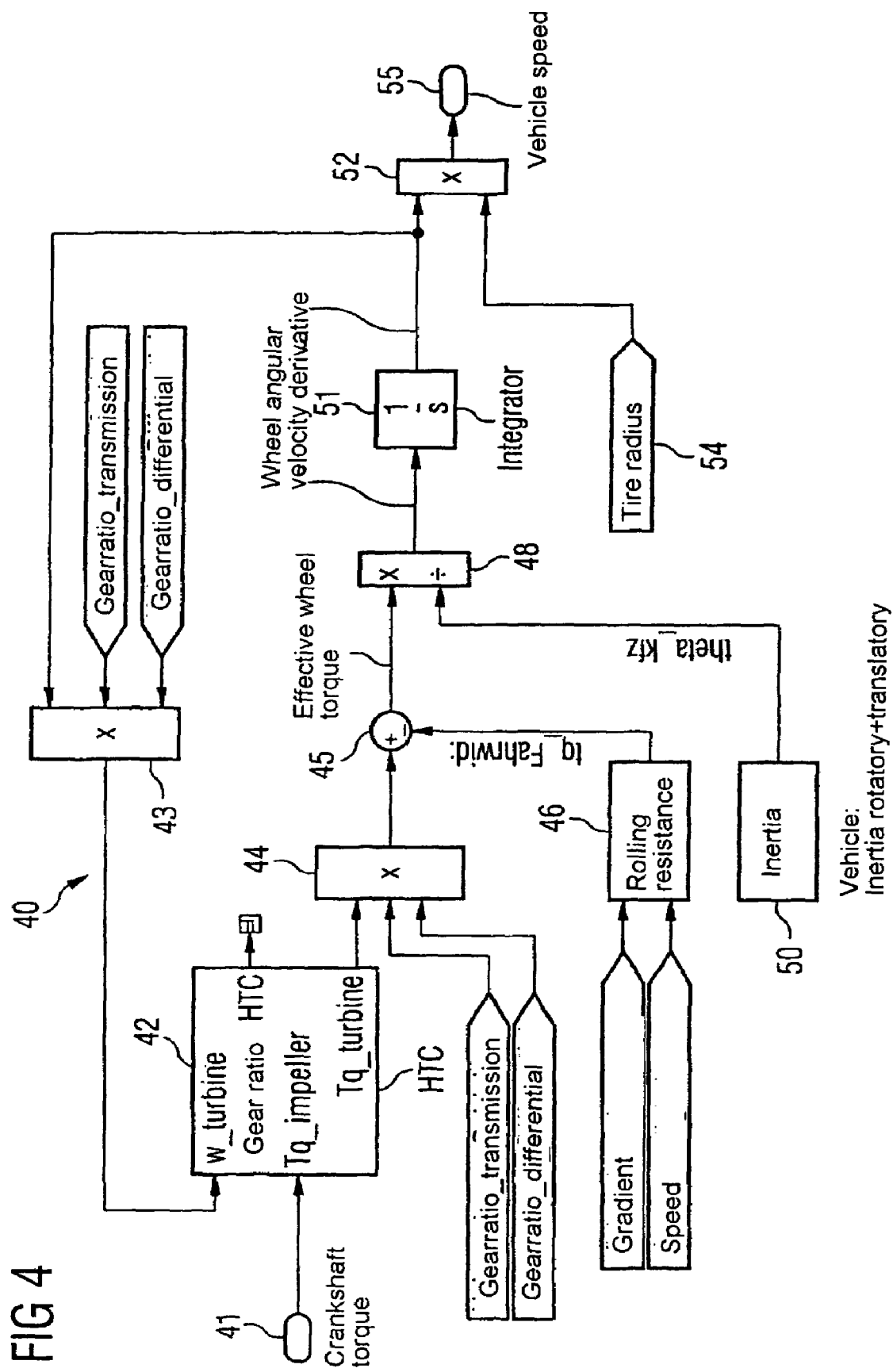

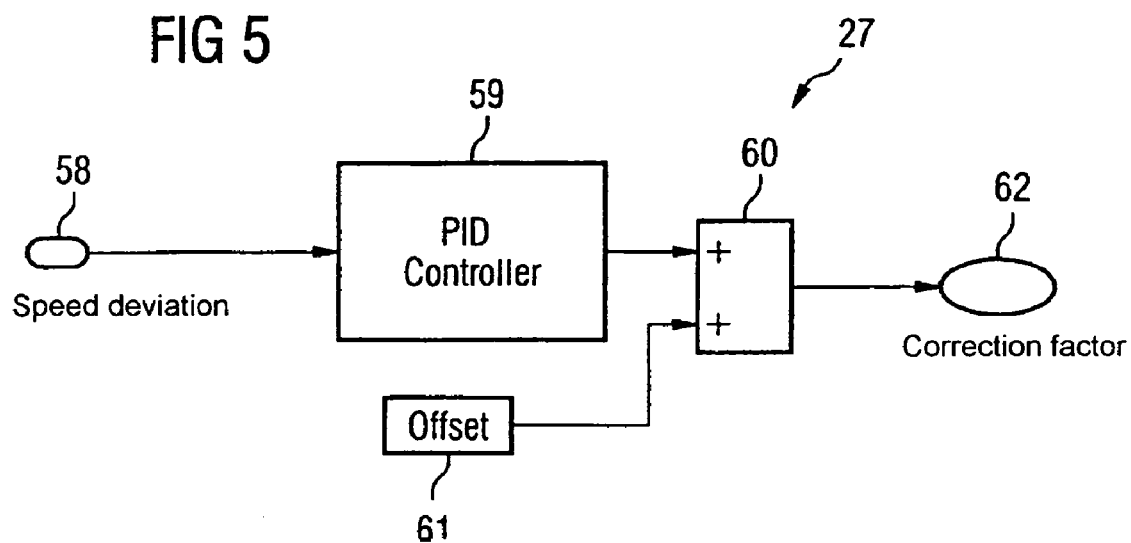

POWERTRAIN OF A MOTOR VEHICLE AND METHOD FOR CONTROLLING SAID POWERTRAIN

CROSS REFERENCE TO RELATED APPLICATION

This application is a continuation of copending International Application No. PCT/DE02/04093 filed Nov. 4, 2002 which designates the United States, and claims priority to German application no. 101 55 433.8 filed Nov. 12, 2001.

TECHNICAL FIELD OF THE INVENTION

The invention relates to a powertrain of a motor vehicle which comprises a controlled power source, a clutch, an automatically shifted transmission and a data transfer system enabling data to be exchanged between the component parts of the powertrain.

DESCRIPTION OF THE RELATED ART

Motor vehicles having an internal combustion engine, an automatic transmission and a hydrodynamic torque converter (hereinafter also referred to as HTC) exhibit a starting behavior which, because of the increased torque provided by the HTC, more specifically in the case of a low converter input/output speed ratio, makes faster vehicle acceleration possible (Fachkunde Kraftfahrzeugtechnik (Technical Information: Automotive Engineering), published by Europa-Lehrmittel, 26th edition 1999, Haan-Gruiten, pp. 403–404). The increased torque provided by the torque converter is therefore experienced as favorable by the motor vehicle driver.

Motor vehicles having a powertrain containing a crankshaft starter/generator (hereinafter also referred to as ISG), an internal combustion engine and an automated manual transmission, but no hydrodynamic torque converter, are only provided with a friction clutch to decouple the crankshaft rotation from the wheel rotation, said clutch being unable to increase the driving torque above the torque at the crankshaft.

SUMMARY OF THE INVENTION

The object of the invention is to create a powertrain of a motor vehicle equipped with a friction clutch which has a starting behavior like that of a motor vehicle provided with a hydrodynamic torque converter.

The object of the invention can be achieved by a motor vehicle powertrain comprising a controlled power source, a clutch, an automatically shifted transmission and a data transfer system enabling data to be exchanged between the component parts of the powertrain, an additional power source, and a control system for producing a correction value for the power source torque on the basis of a comparison of the real behavior of the powertrain with a modeled behavior of a powertrain provided with a hydrodynamic torque converter.

The controlled power source can be an internal combustion engine. The additional power source can be a crankshaft starter/generator, the clutch can be implemented as an automatically actuated friction clutch, and there can be provided a feedback loop for simulating the behavior of a torque converter. The control system may contain a conversion block for converting a required wheel torque to a crankshaft torque on the basis of the correction value, and a correction device in which the correction value for the torque is generated. The control system may have a torque divider for splitting the power source torque between the power source and the additional power source. The control system may have an observer block which represents a model of a powertrain having a hydrodynamic torque converter and is used to calculate a vehicle speed corresponding to the speed assumed by a comparable motor vehicle provided with a hydrodynamic torque converter and an automatic transmission in response to the same driver input. The vehicle speed can be determined in accordance with the following equation $$V_{Fahrzeug} = r_{reifen} * \int \frac{[(tq_{eng} + tq_{ISG}) * \mu_{HTC} * i_{AT} * i_{Diff} - tq_{Fahrwid}]}{theta_{kfz}} dt$$

where:
$\mu_{HTC}$ is the increased torque provided by the hydrodynamic torque converter
$i_{AT}$ is the gear ratio of the automatic transmission
$i_{Diff}$ is the gear ratio of the differential
$r_{reifen}$ is the tire radius
$theta_{kfz}$ is the moment of inertia of the vehicle and
$tq_{Fahrwid}$ is the rolling resistance
$(tq_{eng} + tq_{ISG})'$ is the theoretical driving torque.

The required driving torque for the powertrain can be determined according to the following equation $$(tq_{eng} + tq_{ISG}) = \frac{tq_{wheel}}{slip_{clutch} * i_{AMT} * i_{Diff}} * k_{pid}$$

where:
$i_{AMT} = i_{AT}$ is the gear ratio of the automatic transmission
$i_{Diff}$ is the gear ratio of the differential
$k_{pid}$ is the correction factor
$slip_{clutch}$ is the clutch slip
$tq_{eng}$ is the actual torque of the internal combustion engine
$tq_{ISG}$ is the actual torque of the crankshaft starter/generator
$tq_{wheel}$ is the wheel torque.

The object can also be achieved by a method for controlling powertrain comprising a controlled power source, a clutch, an automatically shifted transmission and a data transfer system enabling data to be exchanged between the component parts of the powertrain, an additional power source, and a control system, the method comprising the step of producing a correction value for the powertrain torque on the basis of a comparison of a real behavior of the powertrain with a modeled behavior of a powertrain provided with a hydrodynamic torque converter.

A conversion block performs a conversion of a required wheel torque to a powertrain torque on the basis of the correction value and that the powertrain torque is divided between the power source and the additional power source. A demanded torque can be converted to a necessary torque at the crankshaft of the power source using the gear ratios of the powertrain components. The method may comprise the step of splitting the power source torque between the power source and the additional power source by a torque divider. The method may also comprise the steps of representing a model of a powertrain having a hydrodynamic torque converter by an observer block and using the model to calculate a vehicle speed corresponding to the speed assumed by a comparable motor vehicle provided with a hydrodynamic torque converter and an automatic transmission in response to the same driver input. The vehicle speed can be determined in accordance with the following equation $$V_{Fahrzeug} = r_{reifen} * \int \frac{[(tq_{eng} + tq_{ISG}) * \mu_{HTC} * i_{AT} * i_{Diff} - tq_{Fahrwid}]}{theta_{kfz}} dt$$

where:
$\mu_{HTC}$ is the increased torque provided by the hydrodynamic torque converter
$i_{AT}$ is the gear ratio of the automatic transmission
$i_{Diff}$ is the gear ratio of the differential
$r_{reifen}$ is the tire radius
$theta_{kfz}$ is the moment of inertia of the vehicle and
$tq_{Fahrwid}$ is the rolling resistance
$(tq_{eng} + tq_{ISG})'$ is the theoretical driving torque.

The required driving torque for the powertrain can be determined according to the following equation $$(tq_{eng} + tq_{ISG}) = \frac{tq_{wheel}}{slip_{clutch} * i_{AMT} * i_{Diff}} * k_{pid}$$

where:
$i_{AMT} = i_{AT}$ is the gear ratio of the automatic transmission
$i_{Diff}$ is the gear ratio of the differential
$k_{pid}$ is the correction factor
$slip_{clutch}$ is the clutch slip
$tq_{eng}$ is the actual torque of the internal combustion engine
$tq_{ISG}$ is the actual torque of the crankshaft starter/generator
$tq_{wheel}$ is the wheel torque.

The powertrain contains an additional power source and is provided with a control system which is used to produce a correction value for the power source torque on the basis of a comparison of the real behavior of the powertrain with a modeled behavior of a powertrain provided with a hydrodynamic torque converter.

Practical developments of the invention are set forth in the sub-claims. The controlled power source is an internal combustion engine; the additional power source is a crankshaft starter/generator (12), the clutch is implemented as an automatically operated friction clutch, and there is provided a feedback control loop (21–27) which is used to simulate the behavior of a torque converter.

The control system contains a conversion block which is used to convert a required wheel torque to a crankshaft torque on the basis of the correction value, and a correction device in which the correction value for the torque is generated. It additionally has a torque divider which is used to split the power source torque between the power source and the additional power source. The control system also contains an observer block which represents a model of a powertrain with a hydrodynamic torque converter and is used to calculate a vehicle speed corresponding to the speed assumed by a comparable motor vehicle provided with a hydrodynamic torque converter and automatic transmission in response to the same driver input. The vehicle speed and the required driving torque for the powertrain are calculated using equations given below.

The advantages of the invention are more specifically that the powertrain is open-loop controlled by the driver input interpreted as wheel torque, and closed-loop controlled on the basis of the deviation between modeled and real vehicle behavior, thereby enabling the required drive characteristics to be achieved inexpensively. The advantageous starting behavior of a conventional automatic transmission with hydrodynamic torque converter is achieved without the high cost and higher fuel consumption necessary for a powertrain of this kind. An additional drive in the form of a crankshaft starter/generator is given another useful function.

BRIEF DESCRIPTION OF THE DRAWINGS

Embodiments of the invention will now be explained with reference to the accompanying drawings in which:

FIG. 3 shows a block diagram for calculating the required power source torque in the feedback control structure according to FIG. 2;

FIG. 4 shows a signal flow diagram of a model of the powertrain according to FIG. 1, and FIG. 5 shows a correction block which is part of the feedback control structure according to FIG. 2.

DETAILED DESCRIPTION OF THE PREFERRED EMBODIMENTS

Figure 1:
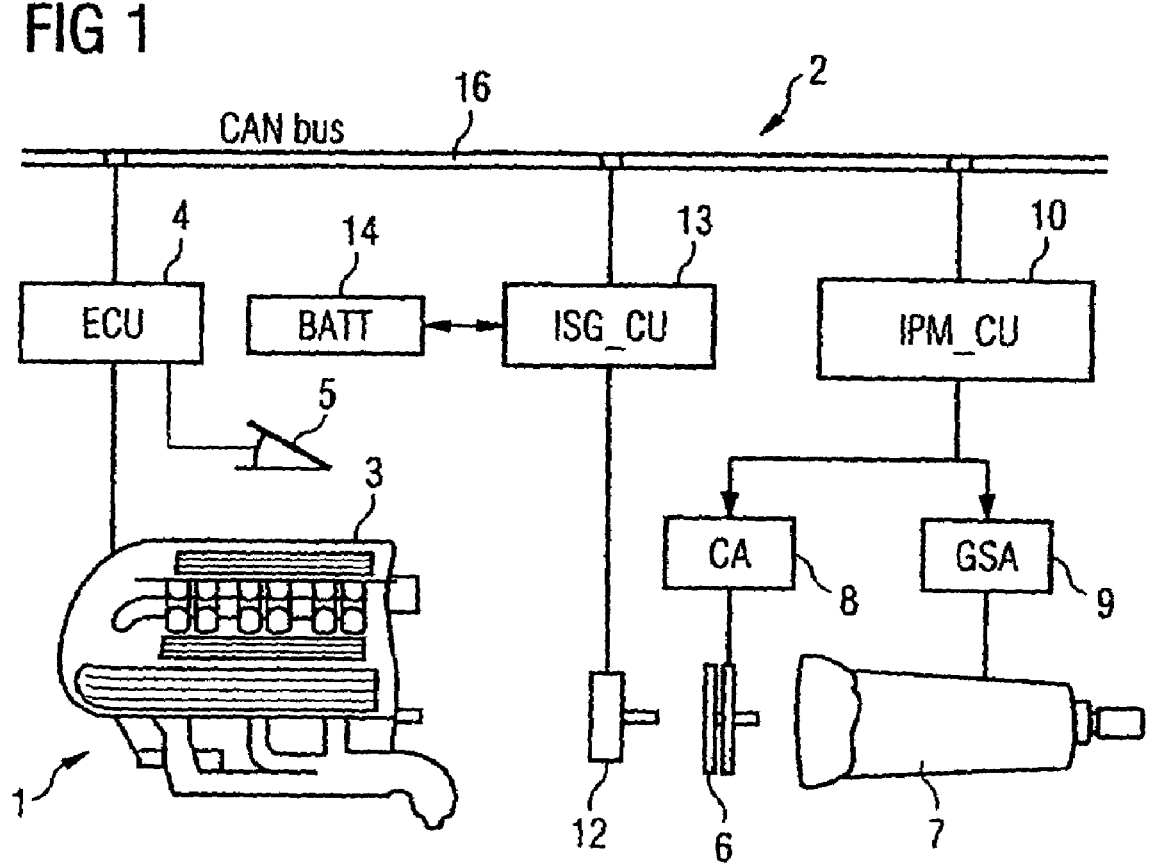
FIG. 1 shows a powertrain provided with a control system according to the invention.

A powertrain 1 of a motor vehicle (not shown) is controlled by a control system 2 (FIG. 1). The powertrain and its control system comprise more specifically a first power source in the form of an internal combustion engine 3, an engine control unit 4 which receives signals from a gas pedal 5, a friction clutch 6, an automated manual transmission 7 (hereinafter also referred to as transmission), a clutch actuator 8 and a gearshift actuator 9 for the transmission 7. A superordinate control unit 10, a so-called IPM control unit (IPM=Integrated Powertrain Management), controls the engine 3 via the engine control unit 4, the friction clutch 6 via the clutch actuator 8 and the automated manual transmission 7 via the gearshift actuator 9.

The powertrain 1 also contains an additional power source in the form of a crankshaft starter/generator 12 (hereinafter also referred to as ISG) which is used as both starter motor and generator. It is controlled by an ISG control unit 13 and is connected via same to an energy storage device 14 implemented here as a 42-volt battery. The control units 4, 10, 13 and 14 are interconnected by a data transfer system in the form of a CAN bus 16 and can therefore exchange status messages, sensor signals, commands and similar information with one another.

The additional power source can also consist of another auxiliary motor, e.g. an electric motor connected to the input shaft of the clutch 6 by a belt or chain.

As already mentioned, the purpose of the control system 2 is to realize, in the above described powertrain 1 without torque converter but having an additional motor, the good starting behavior of motor vehicles with a hydrodynamic torque converter. This is achieved by modeling the response to driver input of a powertrain with hydrodynamic torque converter. Actuation of the gas pedal 5 by the motor vehicle driver is interpreted as driver input.

From a comparison of a real behavior, i.e. in this case the behavior of a motor vehicle with automated manual transmission and crankshaft starter/generator, and of a modeled behavior, i.e. in this case the behavior of a motor vehicle with hydrodynamic torque converter and automatic transmission, a correction value or correction factor is determined which is used to convert the driver input to a torque at the crankshaft (engine torque). The modeling is performed using observer feedback control and is equivalent to calculating the behavior of a mathematical model—the observer model—of the powertrain.

The driver input is regarded as "wheel torque based", i.e. the driver's wish expressed by depressing the gas pedal is converted to a torque transmitted by the wheels to the road and causing the desired vehicle motion. The required wheel torque is back-calculated via the gear ratios of the differential and of the transmission and via the correction factor to the value of the power source torque, i.e. in this embodiment the value of the torque at the crankshaft.

The crankshaft torque is appropriately divided between the first power source and the additional power source, i.e. the internal combustion engine 4 and the crankshaft starter/generator 12, and the two portions are set by the engine control unit 4 and ISG control unit 13 respectively. It is advisable, for example, to output the entire torque demand to the engine control unit 4 until the maximum possible engine torque for the relevant operating state is reached, and to transfer excess portions to the crankshaft starter/generator control unit 13.

Figure 2:
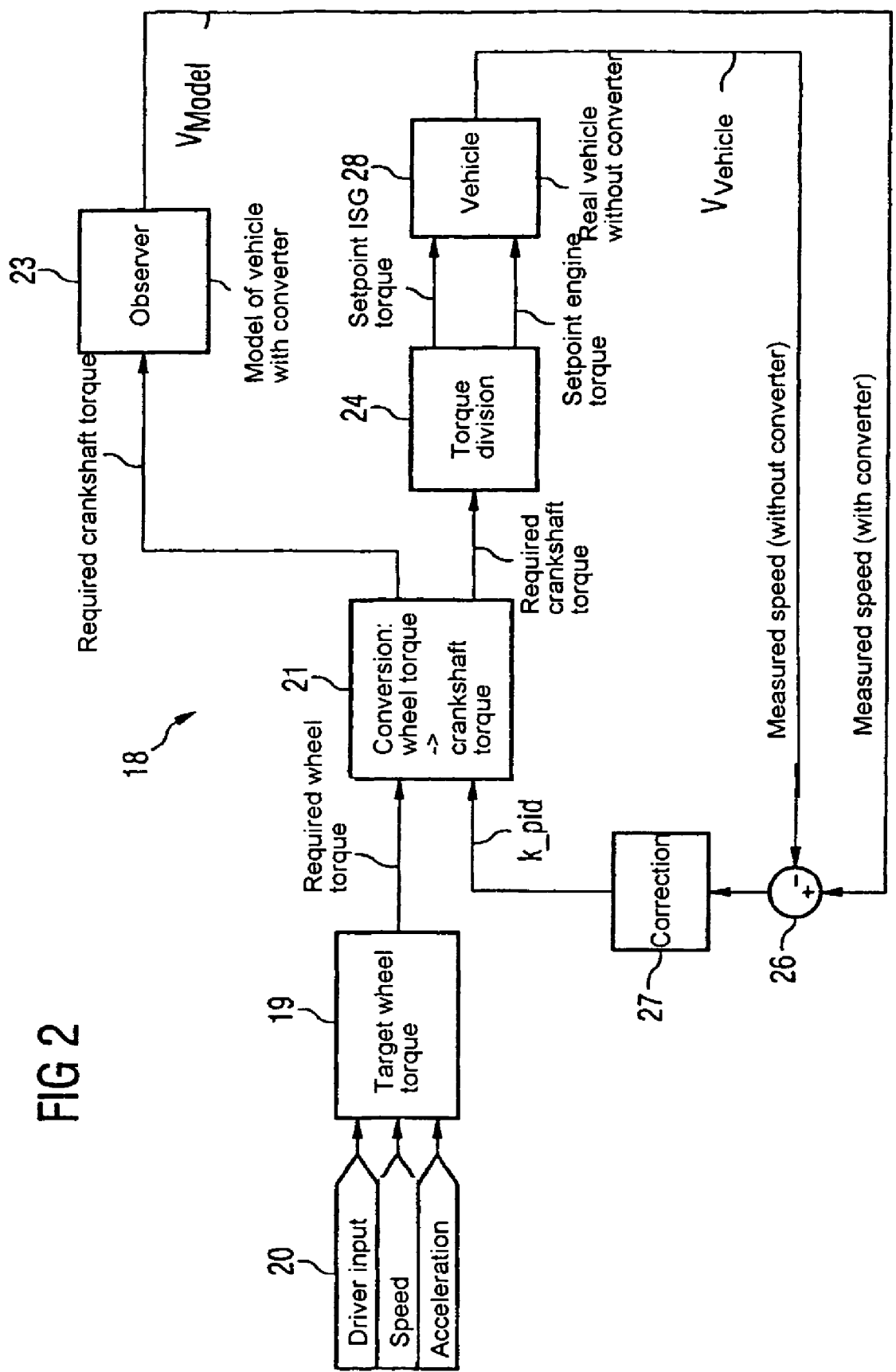
FIG. 2 shows a block diagram of a feedback control structure of the control system according to FIG. 1.

A block diagram (FIG. 2) of the feedback control concept of the control system 2 shows a circuit arrangement 18 comprising the following blocks. A block 19 "target wheel torque" receives the variables "driver input", "speed" and "acceleration" as input signals 20 which are supplied by sensors or individual control devices in the motor vehicle, and determines from these input variables a target wheel torque, i.e. the value of the torque to be applied at the driving wheels of the motor vehicle. The term "block" is used here quite generally for a computing, analyzing, open- or closed-loop control device which can be implemented both as a circuit and as a program.

The demanded torque is converted in a block 21 "Conversion" containing the ratios of the various components of the powertrain 1, more specifically of the differential and of the transmission, to a necessary torque at the crankshaft of the engine 3. The calculation will be explained further with reference to FIG. 3. The block 21 feeds out the required crankshaft torque as an output variable, namely to a block 23 "Observer" on the one hand and, on the other, to a block 24 "Torque divider" as corrected crankshaft torque.

From the crankshaft torque calculated in the block 21, a vehicle speed $V_{Model}$ is calculated in the "Observer" feedback control block 23. This block 23 represents a model of a powertrain with a torque converter, i.e. the vehicle speed $V_{Model}$ corresponds to the speed which a comparable motor vehicle provided with a hydrodynamic torque converter and an automatic transmission would assume in response to the same driver input. As the converter ratio is operating-point dependent, the observer contains a torque converter model which determines the engine RPM from the crankshaft torque and the turbine RPM (back-calculated from the speed). Static characteristics describing the properties of the torque converter are used in the model.

The vehicle speed $V_{Model}$ is applied to the positive input of a subtractor 26 whose output is connected to a block 27 "Correction". Details of the speed calculation and torque division will be explained with reference to the following Figures.

The engine torque portions determined in the block 24, i.e. a setpoint torque for the crankshaft starter/generator and a setpoint torque for the internal combustion engine, are transferred as output signals to the drives of the real motor vehicle without torque converter, said vehicle being symbolized here by a block 28. The motor vehicle then moves at a speed which is measured in the usual way and applied as measured value $V_{Fahrzeug}$ to the negative input of the subtractor 26.

The difference between calculated speed and measured speed is transmitted to the block 27. This block 27 generates a correction factor $k_{pid}$ and applies it to a second input of the block 21, thereby completing a feedback loop for the correction factor $k_{pid}$.

The conversion of the required wheel torque via the gear ratios of the powertrain components to a required crankshaft torque in block 21 will now be explained with reference to FIG. 3. The required wheel torque is fed via a first signal input 30 to the counter input of a divider 31. The correction factor $k_{pid}$ is fed via a second signal input 32 to a first input of a multiplier 34.

The variables clutch slip $slip_{clutch}$, transmission gear ratio $i_{Getr}$ and differential gear ratio $i_{Diff}$ are fed as input signals 35 to the inputs of a second multiplier 36 whose output signal is fed to the denominator input of the divider 31 whose output signal is in turn fed out via a signal output 37 as uncorrected crankshaft torque, i.e. crankshaft torque required for a powertrain with automatic transmission and hydrodynamic torque converter.

On the other hand the output signal is fed to a second input of the multiplier 34 where it is multiplied by the correction factor $k_{pid}$ and then fed out via a signal output 38 as required crankshaft torque for a powertrain with automated manual transmission AMT and crankshaft starter/generator ISG. The output signal corresponds to the value of the following equation:

$$(tq_{eng} + tq_{ISG}) = \frac{tq_{wheel}}{slip_{clutch} * i_{AMT} * i_{Diff}} * k_{pid} \qquad (\text{Eq. 1})$$

where (see also Eq. 2):

$\alpha_{Fahrbahn}$ is the angle of gradient (e.g. measured using a sensor)

$\mu_{HTC}$ is the increased torque due to the HTC (observed variable)

$a_{Fahrzeug}$ is the vehicle acceleration (calculated)

$i_{AMT} = i_{AT}$ is the gear ratio of the automatic transmission (assumed to be constant for the relevant gear)

$i_{Diff}$ is the gear ratio of the differential (assumed to be constant)

$k_{pid}$ is the correction factor $r_{reifen}$ is the tire radius (assumed to be constant)

$slip_{clutch}$ is the clutch slip $theta_{kfz}$ is the vehicle's moment of inertia (assumed to be constant)

$tq_{eng}$ is the actual torque of the internal combustion engine (measured via the data bus)

$tq_{Fahrwid}$ is the rolling resistance as $f(V_{Fahrzeug}$ and angle $\alpha_{Fahrbahn})$ $tq_{ISG}$ is the actual torque of the ISG (measured via the data bus)

$tq_{wheel}$ is the wheel torque $V_{Fahrzeug}$ is the vehicle speed (measured)

$V_{Model}$ is the vehicle speed (calculated)

The signal flow diagram 40 shown in FIG. 4 corresponds to the calculation of the speed $V_{Model}$ from the crankshaft torque in the block 23 "Observer". The crankshaft torque is fed via a signal input 41 to a first input of a block 42 mathematically simulating the hydrodynamic torque converter, namely as engine torque present at the pump impeller of the torque converter. The second input of the block 42 is connected to the output of a multiplier 43 in which the following values are multiplied by the driving angular velocity of the hydrodynamic torque converter: the transmission gear ratio, the differential gear ratio and the angular velocity of a driven wheel.

From an output, the block 42 applies the value of the torque Tq_turbine at the turbine impeller to an input of a multiplier 44 at whose other inputs the values transmission gear ratio and differential gear ratio are likewise present. The product of the three input values is fed to the positive input of an adder 45.

In a block 46 "Rolling resistance", the negative moment of resistance tq_Fahrwid caused by the rolling resistance is determined from the sensors or otherwise recorded values of the road gradient and speed of the motor vehicle and is applied to a negative input of the adder 45 from whose output the resulting effective wheel torque is applied to the counter input of a divider 48.

From a block 50 "Inertia", the mass inertia theta_kfz, namely the rotatory and translatory inertia of the motor vehicle, is fed to the denominator input of the divider 48 where the time derivative of the angular velocity of the wheel is determined and fed to an integrator 51 which calculates therefrom the angular velocity of the wheel and passes it to an input of a multiplier 52 to whose second input the wheel radius value is fed from a memory 54. From the two input values, the multiplier 52 calculates the speed of the vehicle and feeds it out via an output 55. The signal fed out here corresponds to the value of the following equation $$V_{Fahrzeug} = r_{reifen} * \int \frac{[(tq_{eng} + tq_{ISG})' * \mu_{HTC} * i_{AT} * i_{Diff} - tq_{Fahrwid}]}{theta_{kfz}} dt \quad \text{(Eq. 2)}$$

where $(tq_{eng} + tq_{ISG})$ is the theoretical required torque, i.e. the driving torque demanded by the driver, in contrast to the manipulated variables of the powertrain 1 that have to be adapted by the correction factor from the required torque calculation. The meaning of the other formula variables is explained above under equation Eq. 1. The notations $theta_{kfz}$ and theta_kfz, etc. are equivalent here: the former is suitable for mathematical formulae, the latter for computer programs.

Details of the hitherto schematically illustrated block 27 "Correction" are shown in FIG. 5. A PID controller receives the speed deviation $V_{Model} - V_{Fahrzeug}$ via a signal input 58 and then generates a control output which is additively combined with an offset value in an adder 60. The offset value is used to match the control output produced by the PID controller to the gain values of the hydrodynamic torque converter. It has, for example, the numerical value one. The sum forms the correction factor $k_{pid}$ and this is fed out via an output 62, namely as mentioned to the block 21 "Conversion" (see FIG. 2). It forms the manipulated variable and is incorporated as the gain factor in the calculation of the required crankshaft torque for the powertrain 1. This crankshaft torque value is transferred to the real powertrain as the setpoint target.

Comparison of the acceleration behavior of a vehicle with hydrodynamic torque converter and automatic transmission and a vehicle with automated manual transmission and crankshaft starter/generator shows—for the same gas pedal pressure and the same crankshaft torque, i.e. without the correction described above—that the powertrain with torque converter allows a much higher vehicle acceleration because of the increased torque provided by the torque converter.

On the other hand, comparison with a powertrain having automated manual transmission and crankshaft starter/generator and having the described crankshaft torque control shows—with the same gas pedal setting—that this vehicle has an acceleration behavior approximately corresponding to that of a vehicle with hydrodynamic torque converter.

We claim:

1. A motor vehicle powertrain comprising a controlled power source, a clutch, an automatically shifted transmission and a data transfer system enabling data to be exchanged between the component parts of the powertrain, an additional power source, and a control system for controlling said controlled power source and said additional power source on the basis of a comparison of the real behavior of the powertrain with a modeled behavior of a powertrain provided with a hydrodynamic torque converter, wherein the vehicle speed is determined in accordance with the following equation $$V_{Fahrzeug} = r_{reifen} * \int \frac{[(tq_{eng} + tq_{ISG}) * \mu_{HTC} * i_{AT} * i_{Diff} - tq_{Fahrwid}]}{theta_{kfz}} dt$$

where:
$\mu_{HTC}$ is the increased torque provided by the hydrodynamic tongue converter
$i_{AT}$ is the ear ratio of the automatic transmission
$i_{Diff}$ is the gear ratio of the differential
$r_{reifen}$ is the tire radius
$theta_{kfz}$ is the moment of inertia of the vehicle and is the theoretical driving torque.

2. The powertrain according to claim 1, wherein
the controlled power source is an internal combustion engine;
the additional power source is a crankshaft starter/generator,
the clutch is implemented as an automatically actuated friction clutch, and
there is provided a feedback loop for simulating the behavior of a torque converter.

3. The powertrain according to claim 2, wherein the control system contains
a conversion block for converting a required wheel torque to a crankshaft torque on the basis of a correction value, and
a correction device in which the correction value for the torque is generated.

4. The powertrain according to claim 1, wherein the control system contains
a conversion block for converting a required wheel torque to a crankshaft torque on the basis of a correction value, and
a correction device in which the correction value for the torque is generated.

5. The powertrain according to claim 1, wherein the control system has a torque divider for splitting the power source torque between the power source and the additional power source.

6. The powertrain according to claim 1, wherein the control system has an observer block which represents a model of a powertrain having a hydrodynamic torque converter and is used to calculate a vehicle speed corresponding to the speed assumed by a comparable motor vehicle provided with a hydrodynamic torque converter and an automatic transmission in response to the same driver input.

7. A motor vehicle powertrain comprising a controlled power source, a clutch, an automatically shifted transmission and a data transfer system enabling data to be exchanged between the component parts of the powertrain, an additional power source, and a control system for controlling said controlled power source and said additional power source on the basis of a comparison of the real behavior of the powertrain with a modeled behavior of a powertrain provided with a hydrodynamic torque converter, wherein the required driving torque for the powertrain is determined according to the following equation $$(tq_{eng} + tq_{ISG}) = \frac{tq_{wheel}}{slip_{clutch} * i_{AMT} * i_{Diff}} * k_{pid}$$

where:
$i_{AMT}$=1AT is the gear ratio of the automatic transmission
$i_{Diff}$ is the gear ratio of the differential is the correction factor
$Slip_{clutch}$ is the clutch slip
$tq_{eng}$ is the actual torque of the internal combustion engine
$tq_{ISG}$ is the actual torque of the crankshaft starter/generator
$tq_{wheel}$ is the wheel torque.

8. A method for controlling a powertrain comprising a controlled power source, a clutch, an automatically shifted transmission and a data transfer system enabling data to be exchanged between the component parts of the powertrain, an additional power source, and a control system comprising the step of:
controlling said controlled power source and said additional power source to simulate the behavior of a hydrodynamic torque converter by means of a comparison of a real behavior of the powertrain with a modeled behavior of a powertrain provided with a hydrodynamic torque converter, wherein the vehicle speed is determined in accordance with the following equation $$V_{Fahrzeug} = r_{reifen} * \int \frac{[(tq_{eng} + tq_{ISG}) * \mu_{HTC} * i_{AT} * i_{Diff} - tq_{Fahrwid}]}{theta_{kfz}} dt$$

where:
μHTC is the increased torque provided by the hydrodynamic torque converter
$i_{AT}$ is the ear ratio of the automatic transmission
$i_{Diff}$ is the sear ratio of the differential
$r_{reifen}$ is the tire radius
$theta_{kfz}$ is the moment of inertia of the vehicle and
$tq_{Fahrwid}$ is the rolling resistance
$(tg_{eng} + Tq_{ISG})'$ is the theoretical driving torque.

9. The method according to claim 8, wherein a conversion block performs a conversion of a required wheel torque to a powertrain torque on the basis of a correction value and that the powertrain torque is divided between the power source and the additional power source.

10. The method according to claim 9, wherein a demanded torque is converted to a necessary torque at the crankshaft of the power source using the gear ratios of the powertrain components.

11. The method according to claim 8, wherein a demanded torque is converted to a necessary torque at the crankshaft of the power source using the gear ratios of the powertrain components.

12. The method according to claim 8, comprising the step of splitting the power source torque between the power source and the additional power source by a torque divider.

13. The method according to claim 8, comprising the steps of:
representing a model of a powertrain having a hydrodynamic torque converter by an observer block and
using the model to calculate a vehicle speed corresponding to the speed assumed by a comparable motor vehicle provided with a hydrodynamic torque converter and an automatic transmission in response to the same driver input.

14. A method for controlling a powertrain comprising a controlled power source, a clutch, an automatically shifted transmission and a data transfer system enabling data to be exchanged between the component parts of the powertrain, an additional power source, and a control system comprising the step of:
controlling said controlled power source and said additional power source to simulate the behavior of a hydrodynamic torque converter by means of a comparison of a real behavior of the powertrain with a modeled behavior of a powertrain provided with a hydrodynamic torque converter, wherein the required driving torque for the powertrain is determined according to the following equation $$(tq_{eng} + tq_{ISG}) = \frac{tq_{wheel}}{slip_{clutch} * i_{AMT} * i_{Diff}} * k_{pid}$$

where:
$i_{AMT} = i_{AT}$ is the gear ratio of the automatic transmission
$i_{Diff}$ is the gear ratio of the differential
$k_{pid}$ is the correction factor
$slip_{clutch}$ is the clutch slip
$tq_{eng}$ is the actual torque of the internal combustion engine
$tq_{ISG}$ is the actual torque of the crankshaft starter/generator
$tq_{wheel}$ is the wheel torque.

* * * * *